UNITED STATES PATENT OFFICE.

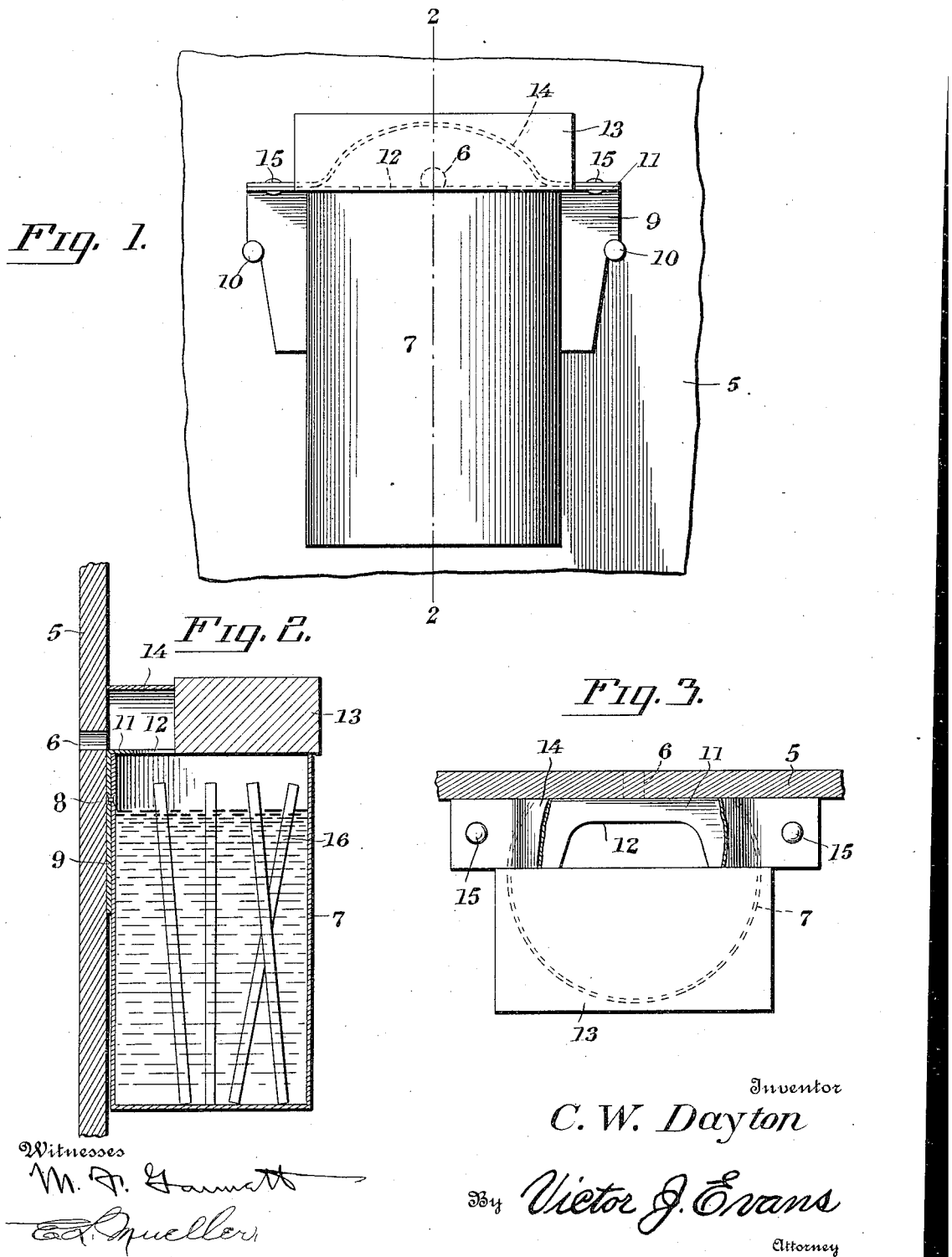

CLYDE W. DAYTON, OF CHATSWORTH, CALIFORNIA.

BEE-FEEDER.

1,052,324. Specification of Letters Patent. Patented Feb. 4, 1913.

Application filed October 11, 1912. Serial No. 725,254.

*To all whom it may concern:*

Be it known that I, CLYDE W. DAYTON, a citizen of the United States, residing at Chatsworth, in the county of Los Angeles and State of California, have invented new and useful Improvements in Bee-Feeders, of which the following is a specification.

The general object of this invention is the provision of a feeding device particularly adapted for use in connection with bee hives, said device including a receptacle which is secured to the hive in such a position as to enable the bees in the hive to have ready access thereto, means being also provided for preventing the bees from other hives or colonies from feeding therefrom.

In carrying out the object of the invention generally stated above, it will be understood, of course, that the essential features thereof are susceptible of changes in details and structural arrangements, one preferred and practical embodiment being shown in the accompanying drawing, wherein:—

Figure 1 is a front elevation of a portion of a hive showing the feeding device applied thereto and constructed in accordance with the invention. Fig. 2 is a section on the line 2—2 of Fig. 1. Fig. 3 is a top plan view partly broken away.

Referring more particularly to the accompanying drawing in which like reference characters designate similar parts 5 indicates a bee hive of any well known construction and which is provided with an opening 6 for the passage of bees from and into the hive. A receptacle 7 made of any suitable material such as tin and adapted to contain a liquid feed for the bees is secured to the hive below the opening 6 by means of a suitable fastener 8. Interposed between the receptacle 7 and the adjacent side of the hive 5 and partially supported by the fastener 8 is a bracket 9 which is also further secured to the hive by means of the fasteners 10 which retain the said bracket in a stationary position. The bracket 9 is provided with an angular extension 11 which projects partially over the open-ended top of the receptacle 7 and is provided medially its ends with a cut-away portion or notch 12 whereby the bees from the interior of the hive may pass through the opening 12 therein and thence through the notch 12 into the receptacle 7, it being understood that said receptacle is closed by means of a block 13 which covers that portion of the top which is not covered by the overhanging extension 11. It will thus be seen that when the block 13 is in position, access may be had to the receptacle 7 only through the opening formed by the notch 12.

In order to prevent the escape of bees from the hive when feeding from the receptacle 7, a hood 14 is provided, the ends of which are secured to the extension 11 by means of the fasteners 15 while the medial portion is bent into substantially semi-circular formation in order to overhang the opening 6, it being understood that the block 13 is of sufficient thickness to inclose the space between the extension 11 and the semi-circular arcuate portion of the hood 14.

In order to prevent the bees from dropping into the liquid in the receptacle 7 and thus drowning, a plurality of sticks 16 may be inserted into the latter in a substantially vertical position thus permitting the bees to crawl down the same and have access to the feed without being immersed therein.

From the foregoing description taken in connection with the accompanying drawing, it will be seen that the invention contemplates providing a bee feeder which is simple in construction, thus reducing the cost of manufacture of the same to a minimum, and which is durable and effective in carrying out the purpose for which it is designed.

What is claimed is:

The combination with a bee hive having an opening therein, of a food containing receptacle open at the upper end and secured to said hive with the open end immediately adjacent the opening, a bracket interposed between said receptacle and the hive and having an angular extension to overlie said receptacle, said extension being formed with an opening immediately adjacent the hive opening to form an entrance to the interior of the receptacle, a block secured to the extension beyond the opening thereof and projecting above the extension with respect to the receptacle, and a hood secured to the extension and covering the opening therein, the side edges of the hood bearing respectively against the hive and against said block.

In testimony whereof I affix my signature in presence of two witnesses.

CLYDE W. DAYTON.

Witnesses:
  STERLING M. THRASHER,
  ALBERT CLEMENTS.

Copies of this patent may be obtained for five cents each, by addressing the "Commissioner of Patents, Washington, D. C."